United States Patent
Gill

(10) Patent No.: US 10,247,332 B2
(45) Date of Patent: Apr. 2, 2019

(54) PIPE COUPLING HAVING ARCUATE SNAP COUPLERS WITH CYLINDRICAL BASE BODY

(71) Applicant: Ajit Singh Gill, Taylorsville, UT (US)

(72) Inventor: Ajit Singh Gill, Taylorsville, UT (US)

(*) Notice: Subject to any disclaimer, the term of this patent is extended or adjusted under 35 U.S.C. 154(b) by 0 days.

(21) Appl. No.: 15/794,920

(22) Filed: Oct. 26, 2017

(65) Prior Publication Data

US 2018/0045346 A1 Feb. 15, 2018

Related U.S. Application Data

(63) Continuation-in-part of application No. 15/235,980, filed on Oct. 26, 2016.

(60) Provisional application No. 62/205,454, filed on Aug. 14, 2015.

(51) Int. Cl.
| | |
|---|---|
| *F16L 23/036* | (2006.01) |
| *F16L 25/12* | (2006.01) |
| *F16L 21/04* | (2006.01) |
| *F16L 37/12* | (2006.01) |
| *F16L 21/08* | (2006.01) |

(52) U.S. Cl.
CPC ............ *F16L 23/036* (2013.01); *F16L 21/04* (2013.01); *F16L 25/12* (2013.01); *F16L 37/1225* (2013.01); *F16L 21/08* (2013.01)

(58) Field of Classification Search
CPC . F16L 21/02; F16L 21/06; F16L 21/04; F16L 21/08; F16L 23/036; F16L 25/12; F16L 37/1225
USPC .................. 285/407, 408, 417, 418, 113, 98
See application file for complete search history.

(56) References Cited

U.S. PATENT DOCUMENTS

| | | | |
|---|---|---|---|
| 1,306,236 A | 6/1919 | Sloan | |
| 1,568,268 A | 1/1926 | Clark et al. | |
| 2,588,573 A * | 3/1952 | Risley | F16L 21/04 285/367 |
| 2,648,551 A * | 8/1953 | Risley | F16L 21/04 285/373 |
| 2,778,661 A * | 1/1957 | Leighton | F16L 23/10 24/279 |
| 3,042,430 A | 7/1962 | Guy | |
| 3,164,401 A * | 1/1965 | Fawkes | F16L 51/024 285/229 |
| 3,400,952 A | 9/1968 | Swenson et al. | |
| 3,733,092 A | 5/1973 | Yorke et al. | |

(Continued)

*Primary Examiner* — Aaron M Dunwoody
(74) *Attorney, Agent, or Firm* — Thorpe North and Western, LLP

(57) ABSTRACT

A coupler for coupling together the end portions of two pipes having radial end flanges includes a single piece cylindrical base body having a receiving opening therethrough to receive and surround end portions of the pipes to be coupled and bridging over a gap between the pipes to be coupled. At least one arcuate coupling member having opposite end flanges extending axially inwardly from the ends of the arcuate coupling member with the length between opposite end flanges being greater than the length of the cylindrical base body is connectable to the cylindrical base body in a coupling position to prevent the passage of the radial pipe flanges to thereby secure the end portions of the pipes to be connected in the cylindrical base body in a connected condition. The arcuate coupling members can be pivotally connected to the cylindrical base body so can move between coupling and uncoupling positions.

5 Claims, 11 Drawing Sheets

(56) References Cited

U.S. PATENT DOCUMENTS

| | | | | |
|---|---|---|---|---|
| 4,496,176 | A * | 1/1985 | Weinhold | F16L 17/073 277/607 |
| 5,359,866 | A * | 11/1994 | Boddy | F16B 2/10 24/270 |
| 5,387,017 | A * | 2/1995 | Gill | F16L 23/024 251/149.8 |
| 5,540,547 | A | 7/1996 | Cole | |
| 5,715,857 | A | 2/1998 | Gill | |
| 5,752,724 | A | 5/1998 | Bormioli | |
| 6,186,560 | B1 * | 2/2001 | Gill | F16L 21/08 285/305 |
| 6,672,334 | B2 | 1/2004 | Gill | |
| 6,921,115 | B2 * | 7/2005 | Gill | F16L 23/16 285/110 |
| 6,971,413 | B2 | 12/2005 | Taylor et al. | |
| 7,455,331 | B2 | 11/2008 | Gill | |
| 7,850,213 | B2 | 12/2010 | Gill | |
| 8,096,591 | B2 | 1/2012 | Gentile, Jr. et al. | |
| 8,474,880 | B2 | 7/2013 | Gill | |
| 2003/0020276 | A1 | 1/2003 | Steele | |
| 2004/0094958 | A1 * | 5/2004 | Treverton | F16L 21/06 285/319 |
| 2006/0220381 | A1 * | 10/2006 | Gill | F16L 21/06 285/320 |
| 2006/0254030 | A1 | 11/2006 | Woltmann et al. | |
| 2008/0012337 | A1 * | 1/2008 | De Bosscher | F16L 21/06 285/411 |
| 2008/0054634 | A1 * | 3/2008 | Dole | F16L 25/12 285/337 |
| 2008/0106096 | A1 | 5/2008 | Gill | |
| 2012/0175875 | A1 * | 7/2012 | Gill | F16L 17/035 285/408 |
| 2014/0008911 | A1 * | 1/2014 | Hartmann | F16L 21/06 285/373 |

* cited by examiner

PIPE COUPLING HAVING ARCUATE SNAP COUPLERS WITH CYLINDRICAL BASE BODY

PRIORITY CLAIM

Priority is claimed to copending U.S. patent application Ser. No. 15/235,980 filed Oct. 26, 2016, which is hereby incorporated herein by reference.

BACKGROUND OF THE INVENTION

Field

The invention is in the field of pipe couplings to connect two pipes or hoses together or to connect a pipe to a valve or other fitting, each having shoulders, grooves, or flanges in their end portions.

State of the Art

Inventor holds U.S. Pat. No. 8,474,880 which shows an arcuate snap coupler joining two unfixed separable face to face flanges where one of the hinges of the snap coupler is positioned between the face to face flanges pivotally attaching an end of the coupler to a fastener bolt which extends between the face to face flanges and through the hinge. Said two flanges are separated by a removable partitioner situated in the interior inside of the coupling body. The invented versatile coupler has an inner single piece cylindrical base body, where each arcuate coupling member with its opposite hinges (made of a cylindrical sleeve) is pivotally held to the cylindrical base body in rotatable position by means of opposite face to face truncated flanges by means of bolts which extend through the face to face opposite openings through said truncated flanges. The invented coupler is also provided an alternate hinge at each end of the coupler (where hinge is made of a linear angle plate reversed in the direction of the center of the coupler), thus two opposite adjacent ends of two couplers of invented coupling can also be fastened (connected) with a holding link enveloping the alternate angle plates. The invented coupling has distinct advantages to make pipe to pipe or pipe to a valve connection having shoulders, grooves, or flanges in their end portions. From here on words flanges, shoulders, and grooves of pipes and valves will be used as synonyms and the word pipe will include hoses, valves, and other fittings or items to be joined to pipes or joined together.

SUMMARY OF INVENTION

According to the invention, a coupler for coupling together the end portions of two pipes, wherein the end portions of the two pipes have radial pipe flanges extending therefrom, includes a single piece cylindrical base body having ends, end portions, and a receiving opening extending from end to end therethrough to receive and surround the end portions of the pipes to be coupled and bridging over a gap between the pipes to be coupled. The radial pipe flanges extending from the end portions of the pipes may be sized to be received within the cylindrical base body or adjacent an end of the cylindrical base body when the end portions of the pipes are received in the cylindrical base body. At least one arcuate coupling member having opposite sides, opposite end portions with opposite end flanges extending radially inwardly from the opposite end portions, and a length between the opposite end flanges greater than the length of the cylindrical base body is connectable to the cylindrical base body in a coupling position wherein the opposite end flanges are positioned with respect to the ends of the cylindrical base body so that when the end portions of the pipes to be coupled are received in the cylindrical base body, the opposite end flanges of the at least one arcuate coupling member will prevent passage of the radial pipe flanges to thereby secure the end portions of the pipes to be connected in the cylindrical base body in a connected condition.

In one embodiment of the invention, the cylindrical base body includes at least one set of truncated flanges on the cylindrical base body to pivotally mount the at least one arcuate coupling member thereto so the at least one arcuate coupling member can be rotated between coupling and uncoupling positions with respect to the cylindrical base body. The at least one set of truncated flanges can be a pair of truncated flanges with one of such pair of truncated flanges extending from each of opposite end portions of the cylindrical base body and with each truncated flange having an opening extending therethrough with said opening through one of the truncated flanges of the pair being aligned with said opening through the other truncated flange of the pair. The at least one arcuate coupling member can be pivotally attached to the cylindrical base body by a connecting shaft extending between the truncated flanges of a set of truncated flanges and through a first connector on one side of the arcuate coupling member positioned between the pair of truncated flanges so the arcuate coupling member can be rotated between the coupling and uncoupling positions. A holding mechanism can be provided to hold the at least one arcuate coupling member in coupling position. In one embodiment, the holding mechanism can be a second set of truncated flanges extending from each of opposite end portions of the cylindrical base body and with aligned openings and a second connector on the opposite side of the arcuate coupling member positioned to fit between the second set of truncated flanges when the at least one arcuate coupling member is rotated into coupling position. When the at least one arcuate coupling member is rotated into coupling position, a second connecting shaft is inserted through the aligned openings in the second set of truncated flanges and through the second connector on the opposite side of the arcuate coupling member between the truncated flanges to hold the arcuate coupling member in the coupling position. In a second embodiment, the holding mechanism can be a holding link that can extend between a holding bracket on the opposite side of the arcuate coupling member and a holding bracket attached to the cylindrical base body or to an adjacent arcuate coupling member.

In one embodiment of the invention, there are two arcuate coupling members and two sets of truncated flanges extending from the cylindrical base body, with the two sets of truncated flanges space to extend from opposites sides of the cylindrical base body, and each of the arcuate coupling members being approximately semicircular, i.e., extending about one hundred eighty degrees around the cylindrical base body between the two sets of truncated flanges. In such embodiment, the first connector of each arcuate coupling member is pivotally connected between a set of truncated flanges, usually the same set of truncated flanges, so that each of the arcuate coupling members can be rotated between uncoupling and coupling positions. When rotated to coupling position, the second connector of an arcuate coupling member is positioned between the other of the set of truncated flanges so that a second connecting shaft can be inserted through the other set of truncated flanges to hold the respective arcuate coupling members in the coupling position.

Using the embodiment of the invention of the invention with two arcuate coupling members as an example, a use of the coupler of the invention can be described as follows. The two arcuate coupling members are pivotally attached to the single piece cylindrical base body bridging over a gap between the opposite end portions of the two pipes to be connected. A side of each arcuate coupling member is held pivotally in place by means of the opposite face to face truncated flanges (constructed at the opposite end portions of the cylindrical base cover) of a set of truncated flanges and a connecting shaft, which may be in the form of a bolt, which extends through the face to face opposite openings through the truncated flanges, and the respective first connectors on a side of the respective arcuate coupling members. Once the pipe ends are properly brought in face to face relationship and the cylindrical base body is positioned properly over the opposite end portions of the pipes to be joined, then the arcuate coupling members held pivotally connected to the cylindrical base body are rotated radially toward the cylindrical base body and the pipe end portions to capture the radial pipe flanges between the opposite end flanges extending radially from the ends of the arcuate coupling members to thereby secure the pipe ends together in connected condition. The holding mechanism is then used to hold the arcuate coupling members in their coupling position. During mounting of the coupler over the end portions of the pipes to be connected, the cylindrical base body is first mounted over one of the pipe end portions to be connected. The end portion of the other pipe is then pushed into the opposite end of the receiving opening through the cylindrical base body. It may be advantageous to mount the cylindrical base body to the end portion of the first pipe inserted into the receiving opening through the cylindrical base body to hold it in substantially fixed position with respect to the end portion of the first pipe inserted while inserting the pipe end portion of the other pipe into the opposite end of the cylindrical base body. For such purpose, a stop member, which may be in the form of a specially shaped nut, may be secured to the end of the cylindrical base body, such as to a truncated flange at the end of the cylindrical base body, to hold the cylindrical base body on the end portion of the first pipe during mounting of the second pipe end portion to the cylindrical base body. This enables the first end of the coupling to be attached to the end portion of the first pipe before the other pipe end portion is pushed into the opposite receiving end of the cylindrical base body.

While the connectors on the sides of the arcuate coupling members may be shaft receiving sleeves and the shafts may pass through holes in the sets of truncated flanges and the shaft receiving sleeve between the truncated flanges, and this arrangement can be used to both pivotally mount the arcuate coupling member and to also hold the arcuate coupling member in connecting position, one or the other, or both of the connectors on the sides of the arcuate coupling members may be a linear bracket along a side the arcuate coupling member and also in some situations along the cylindrical base body adjacent the side of the arcuate coupling member, with a holding link extending between the linear bracket and a shaft or between two linear brackets. In addition, two adjacent linear brackets, such as on adjacent sides of adjacent arcuate coupling members, can be connected by connecting by a holding link enveloping the adjacent linear brackets.

DRAWINGS

The best mode presently contemplated for carrying out the invention is illustrated in the accompanying drawings, in which.

DETAILED DESCRIPTION OF THE ILLUSTRATED EMBODIMENT

Figure 3:
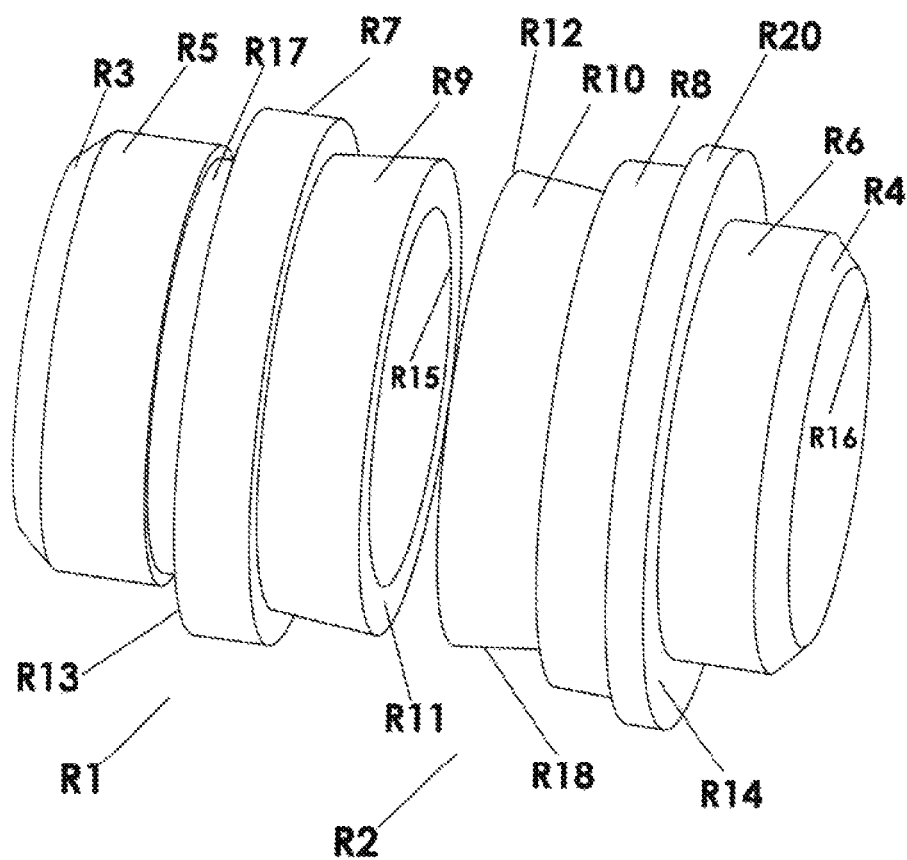
FIG. 3 is a perspective view of two opposite ring assemblies which can be welded to or around the end portions of pipes to be joined.

The drawings are not drawn to any particular scale. Many of the same parts and structures are used and shown on both sides and ends of the coupler. Therefore, they are mostly assigned the same numbers on both sides and ends as shown in the FIGS. To depict other parts of the coupler, numbers of right side elements corresponding with the left side elements are assigned numbers appended with letters in ascending order. Thus, when one side element is being explained, the corresponding element on the opposite side of the coupler will be considered explained simultaneously. Perspective views of parts and assemblies depict the invention clearly, therefore only needed hidden lines are shown in cross sectional drawings. It is understood that large size couplers will be provided with more than two arcuate coupling members. Truncated flanges B1 and B2 form one set of truncated flanges and truncated flanges B3 and B4 form a second set of truncated flanges. Bolts passing through truncated flanges B1 and B2 will be considered bolts of the first set, and bolts passing through truncated flanges B3 and B4 will be considered as bolts of the second set. The bolts and nuts of the first set are the same as in the second set. It is pointed out here that rings R1 and R2 shown in FIG. 3 are modifiable, and rings R1 or R2 can be used at the ends of both opposite pipes. Rings R1 and R2 have been modified to some extent in FIG. 4. Preferably ring R2 is used with a valve to connect a pipe with a valve. While the coupler is described as for coupling together the end portions of two pipes, hoses, valves, and other pipe fittings are included in the definition of pipes since hoses and the portions of these valves and other fittings are similar to pipe ends when intended to be connected to pipe ends.

FIGS. 5 to 8 and FIG. 11 show perspective views of couplers of the invention and FIG. 3 shows a perspective view of and embodiment of rings which are welded to or otherwise attached to the end portions of pipes to be joined to form radially extending flanges on the pipe end portions. FIGS. 1 to 9 and FIG. 11 can be studied simultaneously. As shown in FIG. 2, it will be understood that the opposite end flanges C5 and C6 of the arcuate coupling members can have different radii if opposite rings at ends of opposite pipes differ in design, but have the same radii when rings of same design with same radii shoulder or groove are used at the end portions of each of the pipes.

The drawings show only two arcuate coupling members mounted around the cylindrical base body for the couplers, but it will be understood that more than two arcuate coupling members can be used for large size pipe or only a single coupler may be used for small size pipe with very low pressure.

Figure 1:
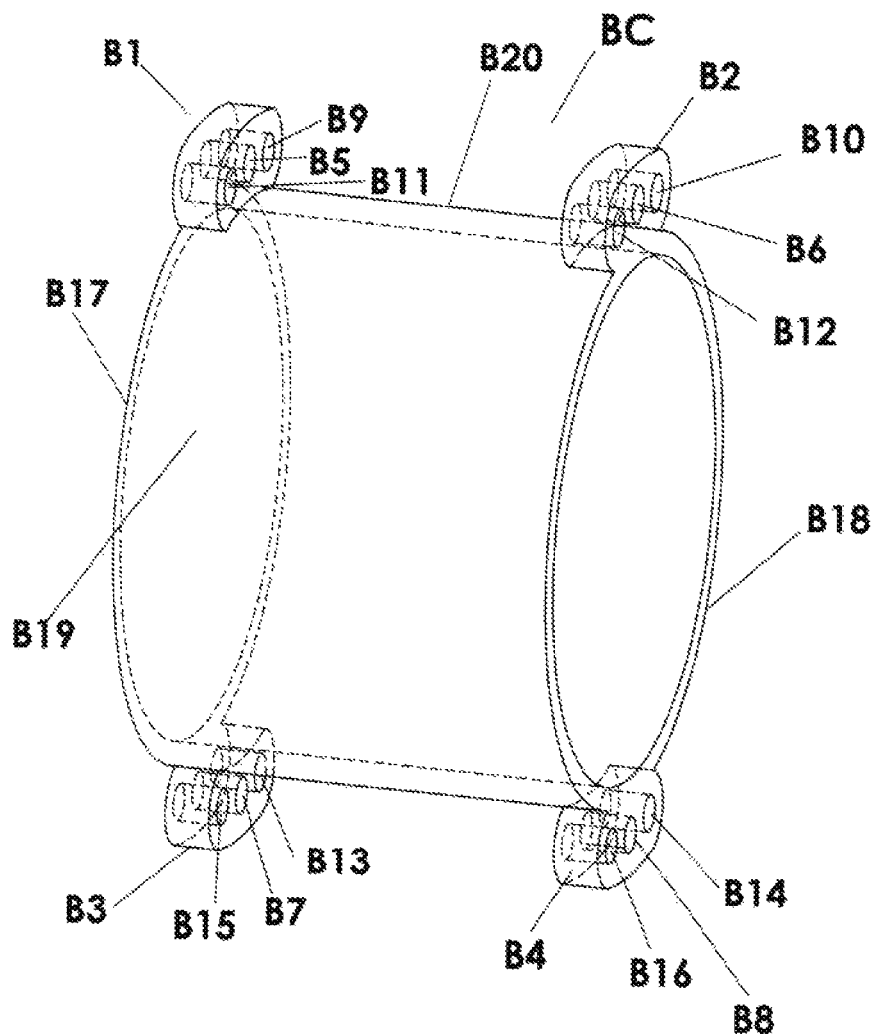
FIG. 1 is a perspective view of the cylindrical base body of the coupler showing face to face truncated flanges at its opposite ends, and depicting face to face opposite openings for receiving bolts.
Figure 2:
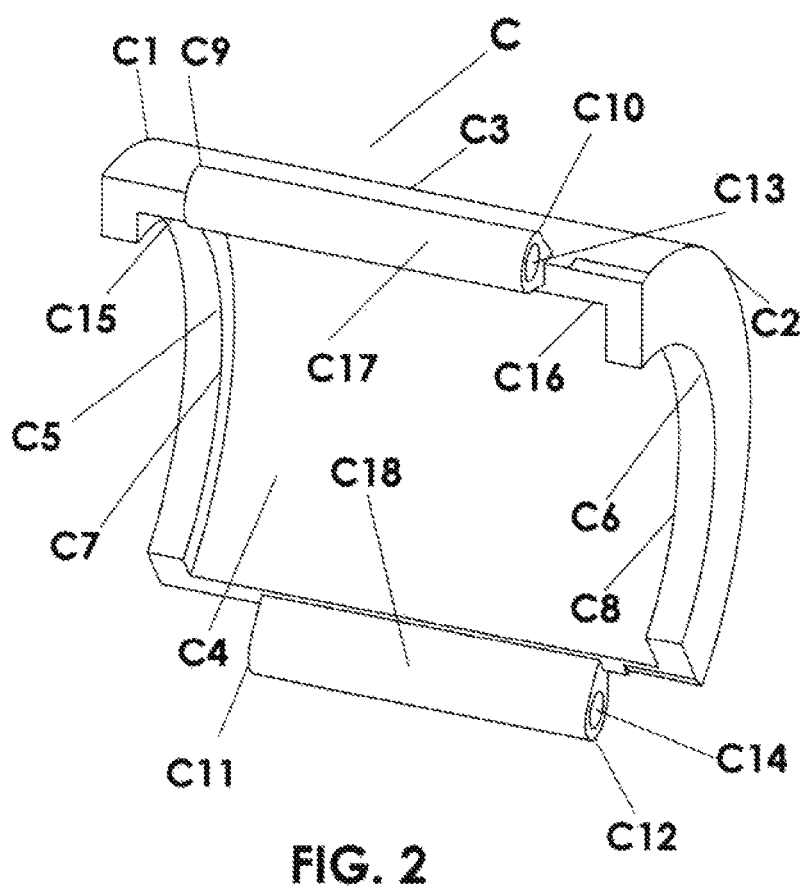
FIG. 2 is a perspective view of an arcuate coupling member, where two connectors are depicted along opposite sides of the arcuate coupling member and two opposite end flanges extending radially inwardly are depicted at opposite ends of the arcuate coupling member.
Figure 5:
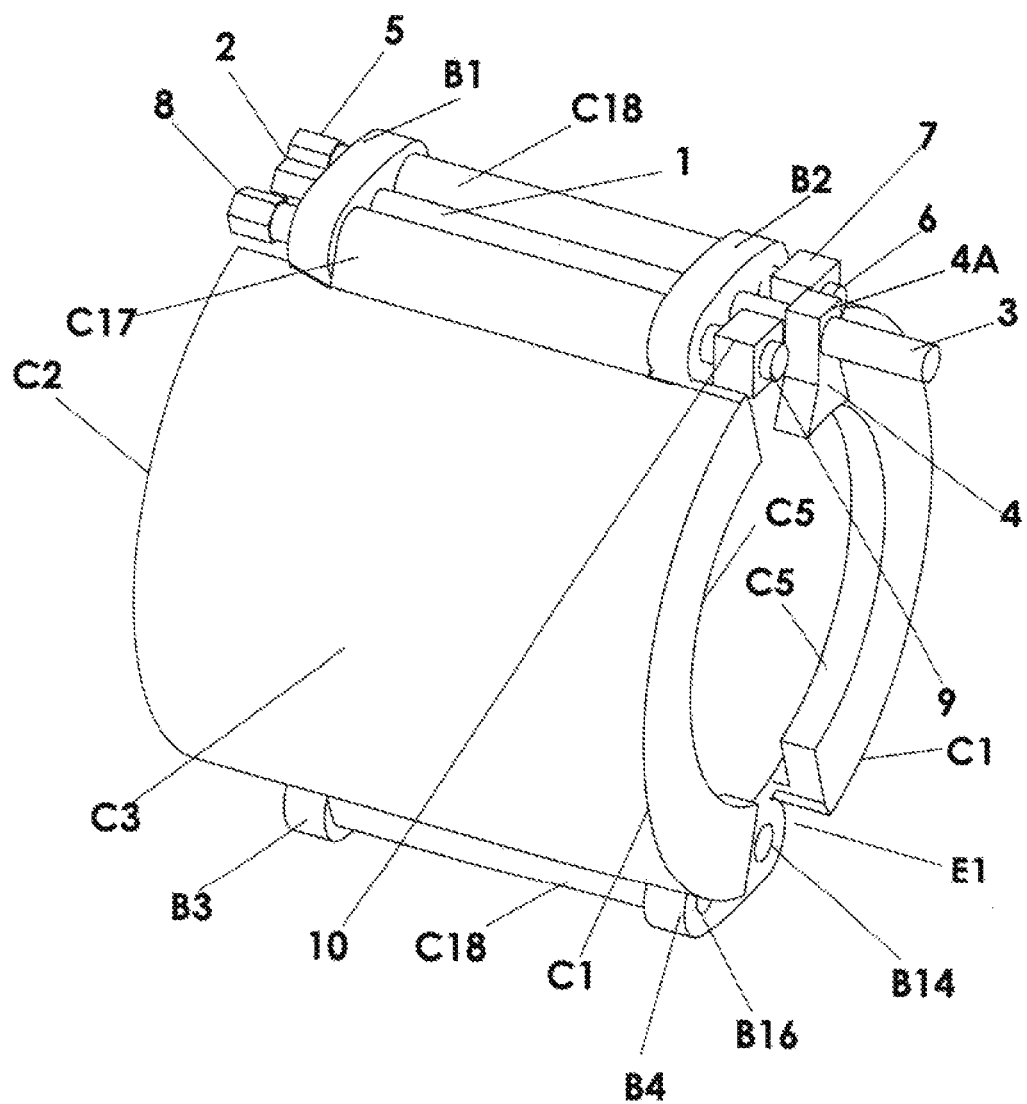
FIG. 5 is a right side longitudinal perspective view of the arcuate coupling member pivotally connected to the cylindrical base body using one set of truncated flanges extending from opposite end portions of the cylindrical base body.
Figure 6:
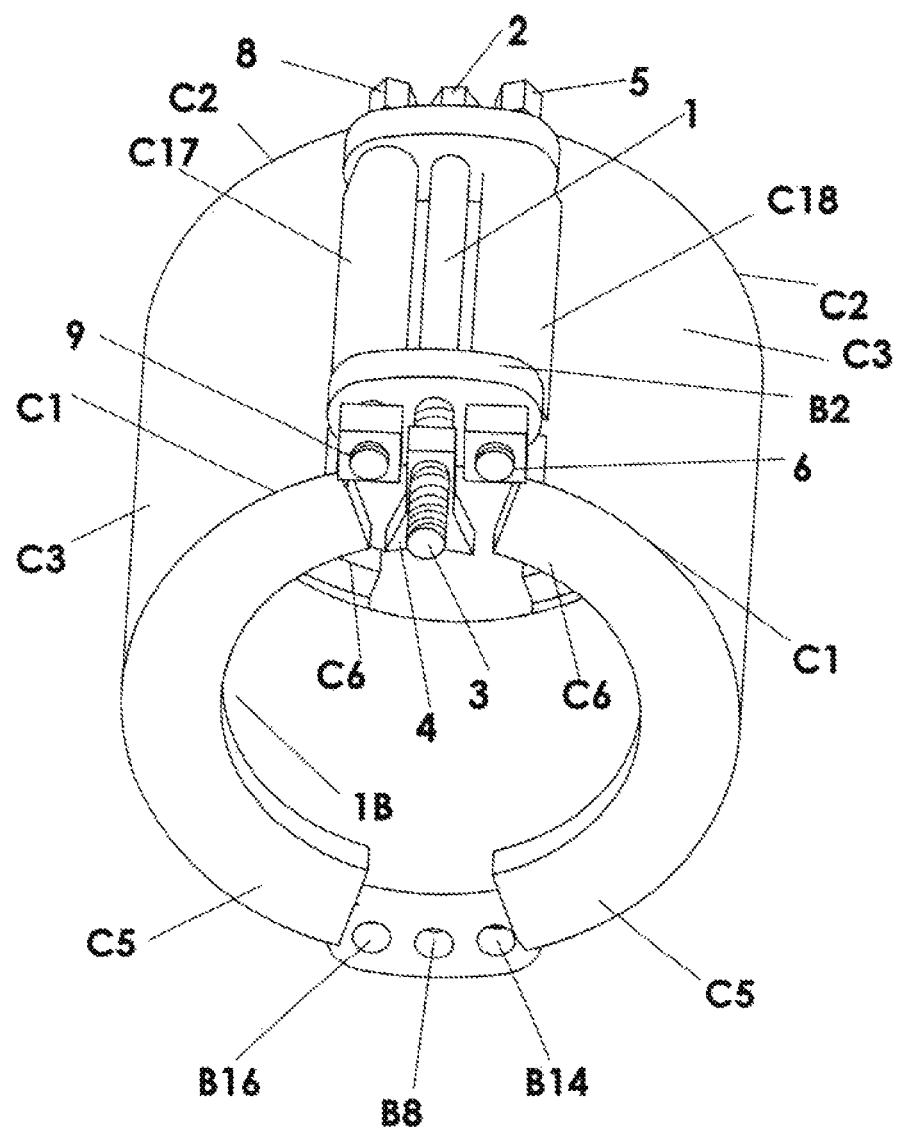
FIG. 6 is a frontal perspective view of the coupler shown in FIG. 5.
Figure 7:
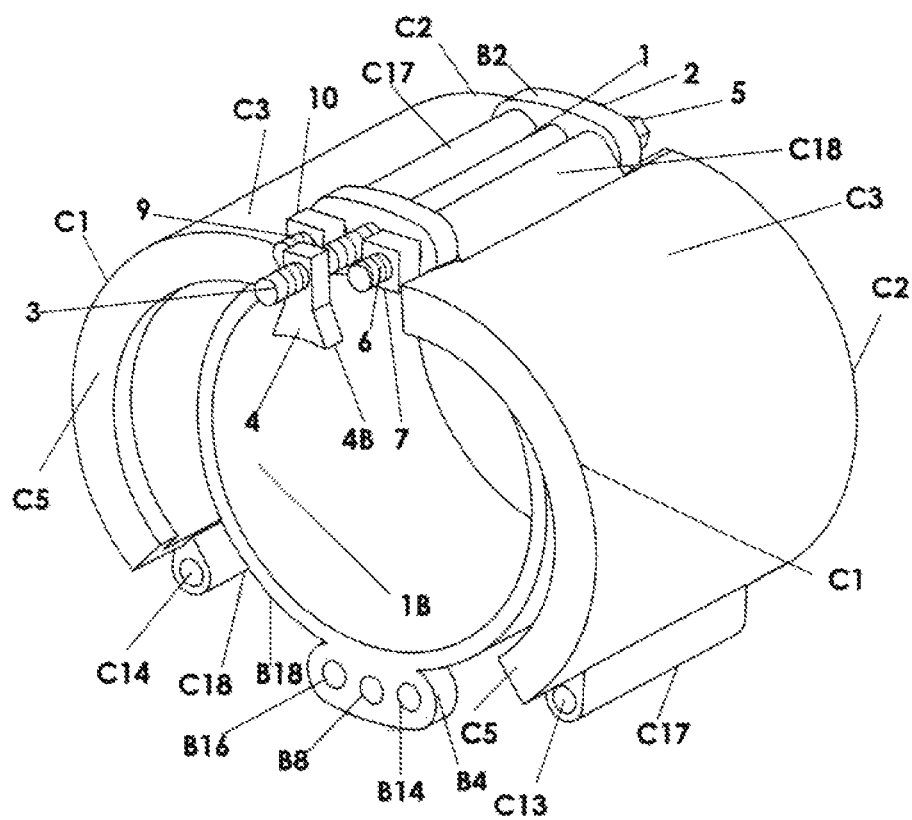
FIG. 7 is a left side longitudinal perspective view of the coupler shown in FIG. 5, showing the cylindrical base body with two arcuate coupling members partially rotated into open uncoupling position.

FIG. 1 shows the single piece cylindrical base body B20 of the coupling body BC which has opposite face to face truncated flanges B1, B2 of the first set, and B3, B4 of the second set constructed on its opposite ends B17 and B18 by casting along the cylindrical base body or they can be welded to the cylindrical base body. As shown in FIGS. 5 to 7, connectors on the sides of arcuate coupling members C3, shown as sleeves C17 and C18 depicted in FIG. 2 are rotatably attached to the cylindrical base body B20 by means of bolt fasteners 5 and 8 forming shafts between truncated flanges B1 and B2. This arrangement provides a hinge attachment for the arcuate coupling members C3 to the cylindrical base body B20. Similar bolts fasteners and truncated flanges B3 and B4, where bolts and nuts are not shown in B3 and B4, form a holding mechanism to hold the arcuate coupling members C3 in coupling position. Thus, as shown in FIGS. 5 and 6, when the arcuate coupling members C3 are rotated into coupling position so that sleeves C17 and C18 are positioned between truncated flanges B3 and B4, bolt fasteners can be passed through truncated flanges B3 and B4 and sleeves C17 and C18 positioned therebetween to hold the arcuate coupling members C3 in rotated coupling position. It is understood that similar bolts and nuts of the first set are used through the openings B13, B14, B15, B16, and B7, B8 and of the second set of truncated flanges B3 and B4. Only one set of bolts to hold sleeves C17 and C18 are shown in FIGS. 5, 6, and 7, and opening B14, B16 and B8 are kept visible for clarity of the invented coupling for easy understanding. As shown in FIG. 5, first sleeve C18 is pivotally attached to the cylindrical base body by passing stem 6 of bolt fastener 5 through the openings B9 and B10 in truncated flanges B1 and B2. Bolt 5 is held in place by tightening nut 7 against truncated flange B2. Similarly second sleeve C17 is pivotally attached to the cylindrical base body by means of bolt fastener 8 and nut 10 by tightening of nut 10 against truncated flange B2. It is mentioned here as shown in FIGS. 8, 9, 10, and 11 that a metallic cover cap E1 also can be used as a fastener to connect opposite sleeves C17 and C18.

Arcuate coupling member C shown in FIG. 2 is shown in different mounted views around the coupling body in FIGS. 5 to 7. The coupler C has outer surface C3 and inner surface C4, and it is provided with opposite end flanges C5 and C6 extending radially inwardly and having different radii, but in most cases C5 and C6 will have same radii. Inner faces of opposite end flanges C5 and C6 in FIG. 2 of arcuate coupling member C are indicated by C7 and C8. The length of opposite hinges C17 and C18 between truncated flanges B1 and B2, and truncated flanges B3 and B4 are depicted extending between C9 and C10, and C11 and C12, respectively. Distance between C9 and C7 is indicated by C15; and distance between C10 and C8 is indicated by C16. It is pointed out here that the above mentioned distances C15 and C16 can be equal, if ring R1 is used at both ends of pipes. The width of the coupler C is shown between C1 and C2.

Opposite face to face openings B5, B6, and B7 and B8 are provided in truncated flanges B1 and B2; B3 and B4 respectively for anchor bolt 2, where its threads are on stem 3 with anchor or stop member, shown as nut 4, which serves as a member, are shown in FIG. 6. Nut 4 has narrower top flange 4A than the wider bottom flange 4B shown in FIGS. 5 to 7. Nut 4 can be of any design. Only one anchor nut is shown in the drawings. If nut 4 is not provided with internal threads, then an extra conventional nut with threads will be provided to exert force against nut 4 to hold it against the end of the cylindrical base body.

FIG. 3 shows rings R1 and R2 which would be welded around the end portions of two opposite pipes or their ends R3 and R4 would be welded to the ends of the pipes. Rings R1 and R2 provide the radial pipe flanges R7 and R20 to the end portions of the pipes to be joined.

Figure 4:
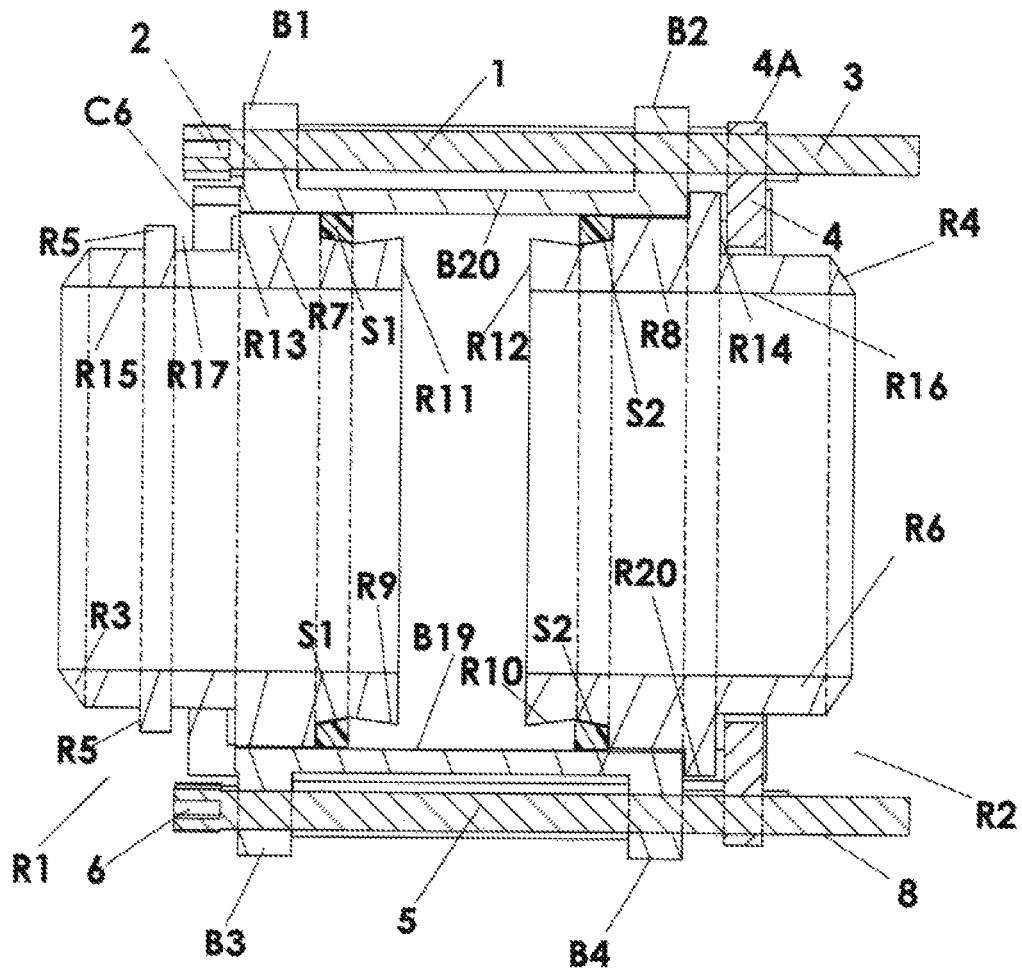
FIG. 4 is a transverse longitudinal vertical section through the coupler depicting connection of two pipes in end to end relationship.

FIGS. 3 to 7 should be studied together. In FIG. 4, seal gaskets S1 and S2 are shown mounted around modified ring portions R9 and R10. Inner shoulder of groove R17 is formed by the outer surface R13 of radial pipe flange R7. The extended portions of rings beyond groove 17 and radial pipe flange R20 are indicated by R5 and R6, respectively. To mount the coupler around the rings R1 and R2 in FIG. 4, first seal gaskets S1 and S2 are mounted around end portions R9 and R10 of opposite rings. Then (as shown in FIG. 7) the set of arcuate coupling member sleeves C17 and C18 between truncated flanges B3 and B4 of the cylindrical base body are freed by removal of their bolt fasteners so that the arcuate coupling members can be rotated around bolt fasteners 5 and 8 between truncated flanges B1 and B2 from the coupling position to an open uncoupling position. Each arcuate coupling member is rotated to open it to the extent needed for the uncoupling position so that the end portions of the pipes to be connected can be inserted into the cylindrical base body. This means that radial pipe flanges R7 and R20 provided by rings R1 and R2 have to pass the opposite end flanges of the arcuate coupling members so are positioned between the opposite end flanges of the arcuate coupling members. Then receiving opening B18 of cylindrical base body B20 is mounted around ring R2 till it is stopped by the radial pipe flange R20 as shown in FIG. 4. Then anchor nut 4 around stem 3 of bolt 1 tightened against radial face R14 of radial pipe flange R20 by rotating bolt head 2. In this way, radial pipe flange R20 is secured against end B18 of cylindrical base body B20, shown in FIG. 4. Ring R1 of the second pipe is then pushed into opposite receiving opening B19 of cylindrical base body B20 until radial face R13 of radial pipe flange R7 of ring R1 aligns with the end B17 (FIGS. 1 and 4) of cylindrical base body B20.

Once the end portions of the pipes to be joined are inserted into and received in the receiving opening of the cylindrical base body, each of the arcuate coupling members is then rotated around its hinged side to move the opposite sides toward one another to move the arcuate coupling members to the closed coupling positions around. rings R1 and R2 to capture the opposite radial faces R13 and R14 of radial flanges R7 and R20 within (between) opposite end flanges C5 and C6 of the arcuate coupling members, When in these closed coupling positions, sleeves C17 and C18 are positioned between truncated flanges B3 and B4 and the second set of bolts can be inserted through truncated flanges B3 and B4 and sleeves C17 and C18 to hold the arcuate coupling members in coupling position. Inner surfaces of R1 and R2 are shown by R15 and R16. Once the shoulder groove R17 of the ring R1 has been captured by the opposite end flange C5, the pipe ends can make only predetermined movement inside the predetermined length of the groove. If a need arises to change seal gaskets in the coupler, the bolts holding one side of each of the arcuate coupling members in coupling position is removed to allow the arcuate coupling members to be rotated to uncoupling position. With the arcuate coupling members in the uncoupling position, the cylindrical base body can generally be slid along one of the pipe end portions to the extent necessary to expose the gap between pipe ends and the sealing gasket can be removed and replaced through this gap. It should be noted that with the arrangement of rings shown in FIGS. 3 and 4 the cylindrical base body can only be slid along the pipe in one direction, to the left in FIG. 4. This is because the radial pipe flange R20 is larger than the opening B18 of the receiving opening through the cylindrical base body so the end of the cylindrical base body abuts against the radial pipe flange R20 and cannot slide to the right beyond radial pipe flange 20. However, radial pipe flange R7 is of a diameter to be received in the receiving opening through the cylindrical base body, so that when the arcuate coupling members are moved to uncoupling position, the cylindrical base body can slide over radial pipe flange R7 (radial pipe flange R7 passes through the receiving opening through the cylindrical base body) so the cylindrical base body can slide to the left over the pipe end portion on the left to expose the gap between the pipe ends. If the larger diameter radial pipe flange R20 is present on both sides of the coupler, the coupler cannot slide in either direction along the pipe ends to the extent necessary to expose the gap between the pipe ends. The gap between the pipe ends is shown between pipe end faces R11 and R12.

Figure 8:
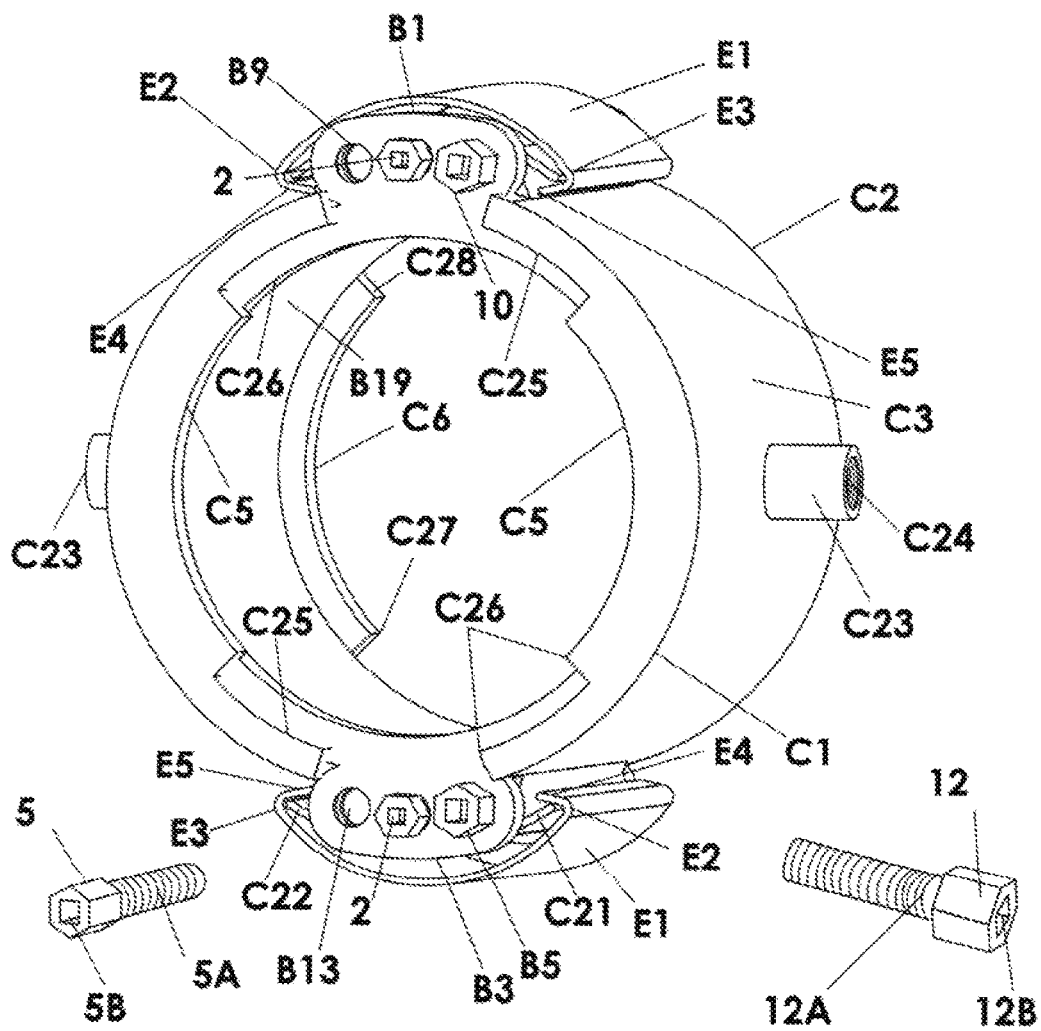
FIG. 8 is a perspective view of the coupler where the arcuate length of opposite end flanges of the arcuate coupling members are shortened by cutsand showing a different embodiment for connecting the arcuate coupling members.
Figure 9:
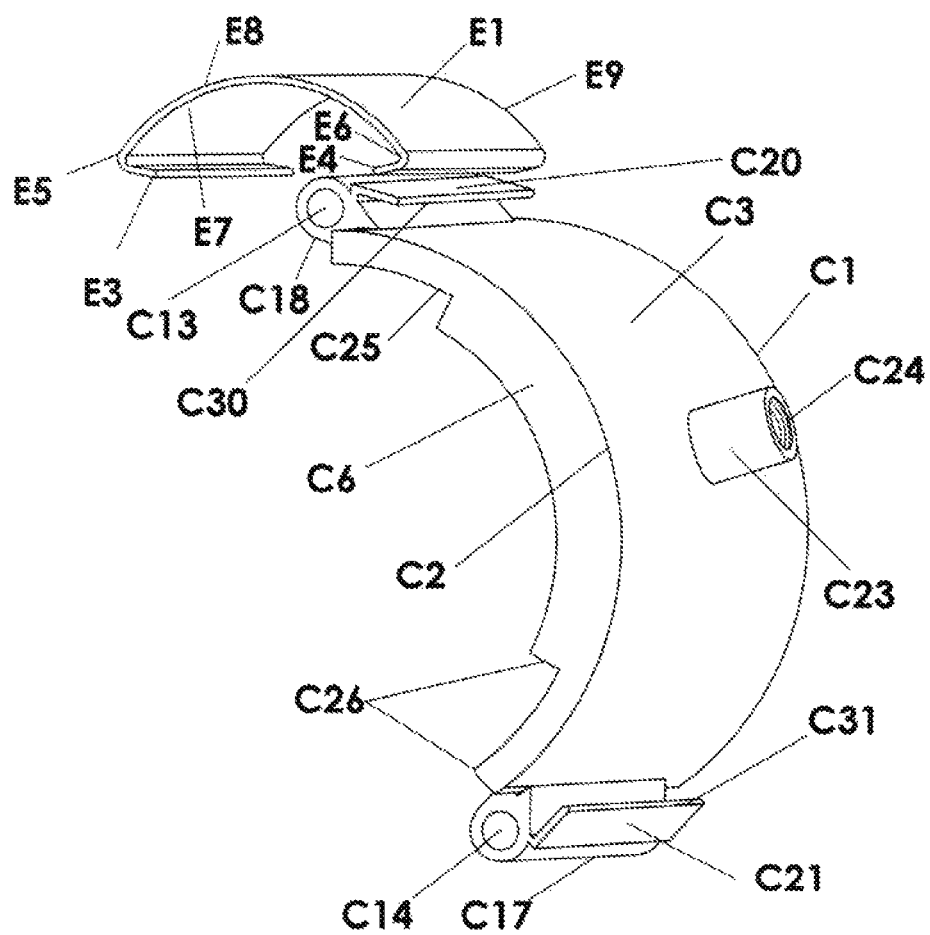
FIG. 9 is a perspective view of the arcuate coupling member and holding link of the coupler shown in FIG. 8.
Figure 10:
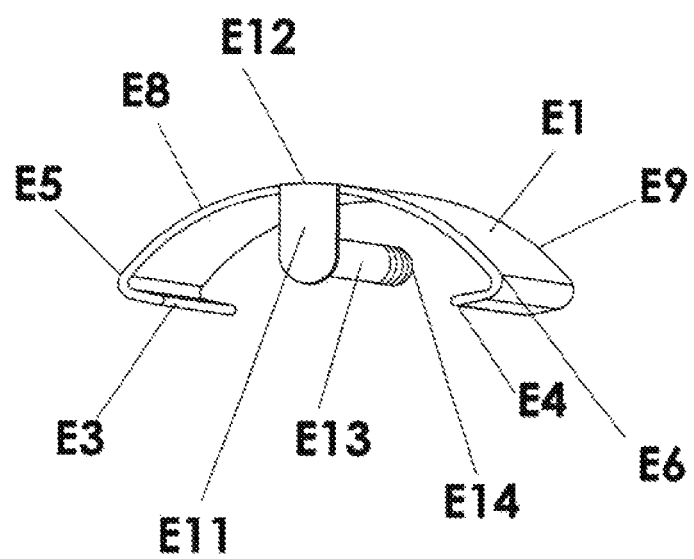
FIG. 10 shows a holding link similar to the holding link shown in FIG. 9.

FIGS. 8 to 11 show the arcuate length of opposite end flanges C5 and C6 of the arcuate coupling members shortened by cut section C25 and C26. Threaded socket C23 with threads C24 is provided for handle bolt 12. A threaded handle bolt stem is shown by 12A and handle bolt head is shown by 12B. It is understood that this handle bolt 12 can be used for large couplers for large pipes to ease connecting and disconnecting of the coupler. It is understood that the handle can be of various designs. Threaded stem 12A of bolt 12 with head 12B shown in FIG. 8 is driven into threaded opening C24 of socket C23. Metallic holding link E1 (shown fully in FIG. 10) captures opposite ends C30 and C31 of linear brackets C20 and C21, shown in FIG. 9, and function as a fastener to fasten C20 and C21. It is pointed out that lengths of bolts 5 and 12 in FIG. 8 and E13 in FIG. 10 are not to any scale and they only depict typical bolts. Each of bolts 2 as shown in FIG. 8 is the same bolt with stem 3 and nut 4A shown in FIG. 5.

FIGS. 9 and 10 will be studied together which show their perspective views. Arcuate coupling member C3 is depicting a socket C23 with internal threads C24. As mentioned earlier, socket C23 is used for handle bolt 12 shown in FIG. 8 to pry away hinges C18 or C17 from the cylindrical base body and to rotate each arcuate coupling member around the pivoted hinge at the opposite side of the arcuate coupling member. Openings through sleeves C18 and C17 are shown by C13 and C14 respectively. Linear brackets C20 and C21 can be made an integral part of sleeves C18 and C17 respectively by welding them to the sleeves or they can be an integral part of the arcuate coupling member C3, where sleeves C18 and C17 are completely removed from the sides of the arcuate couplings members. The relative size of metallic holding link E1 and linear brackets C20 in their free state is shown in their perspective views by positioning E1 over C20. An alternative design of E1 also is shown in its perspective view in FIG. 10, where integral bolt E13 with its welded head E11 is provided to mount holding link E1 around and capture linear brackets C20 and C21. A nut for bolt stem E13 for holding link E1 is not shown, Stern E13 of each holding link E1 is pushed through openings B6, B5, and B8 and B7, shown in FIG. 1, and secures E13 of each holding link against truncated flanges B1 and B3 with a nut not shown in FIG. 10. Opposite ends of holding link E1 are indicated by E5 and E6, and the linear length of E1 is indicated between E8 and E9. The integral linear brackets E3 and E4 are shown making angles at E5 and E6 respectively. It is clear that bolts also can be mounted through and between E3 and holding link E8; and E4 and holding link E9 respectively.

Figure 11:
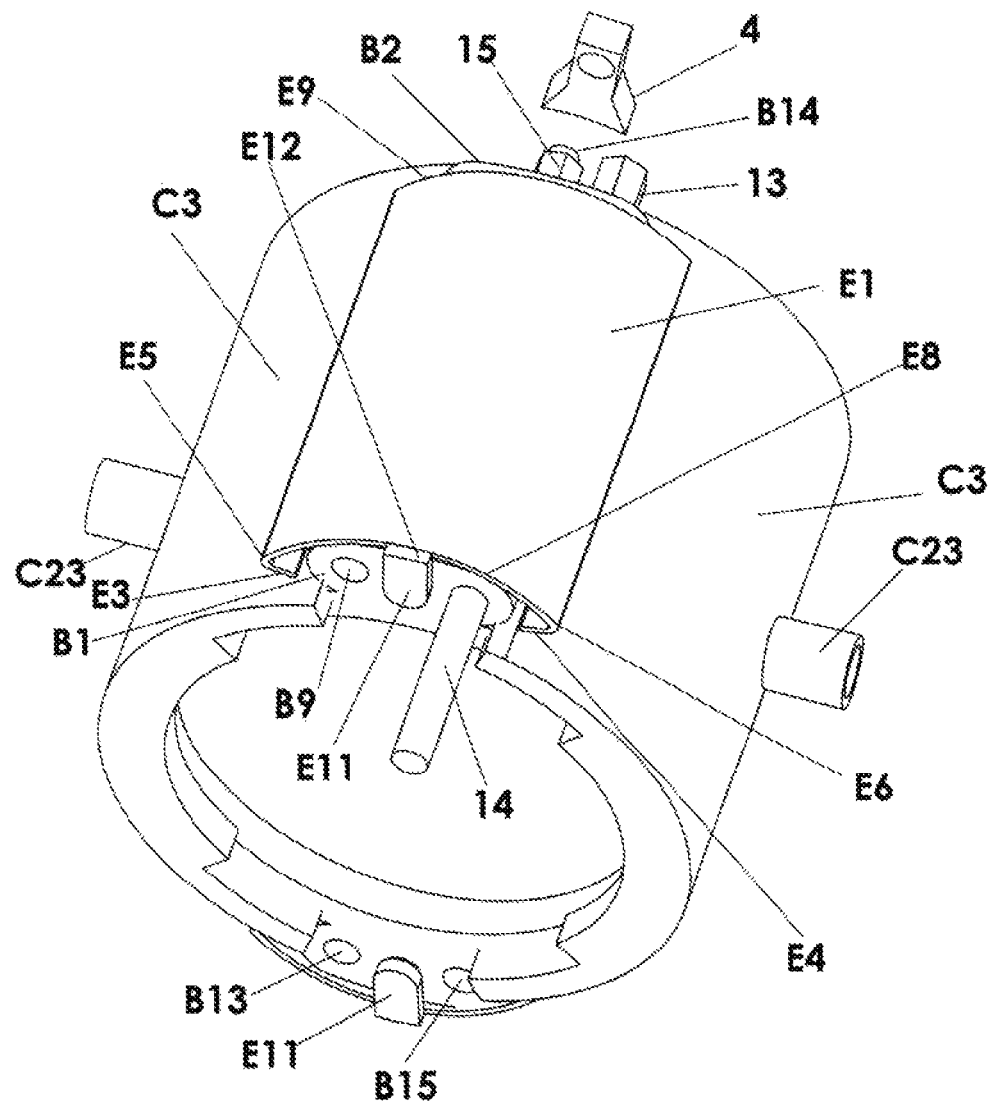
FIG. 11 is a perspective view of a coupler similar to that shown in FIG. 9.

FIG. 11 is a perspective view of a coupler, where some bolts and nuts are not shown, and holding link E1 shows with integral bolt head E11 welded to E1 at E12. Stem E13 of bolt E11 is mounted through openings B8 and B7 to connect linear brackets C20 and C21 with E1. If desired, anchor nut 4 may be used in front of nut 15. If holding link E1 is used and sleeves C18 and C17 are removed from the assembly, then temporary bolts like bolt 13 having long stems 14 may be used to properly position the arcuate coupling members till C20 and C21 are captured inside holding link E1, and holding link E1 is secured. Once holding link E1 is secured in place around C20 and C21, then bolts 13 with long stems 14 are removed. In this case of using temporary bolts, stems 14 need not be threaded. All other elements of the coupler in FIG. 11 have been discussed earlier.

While the invention has been described with respect to presently preferred illustrated embodiments, it is understood that seals S1 and S2 may be "U" or "O" type conventional seals. It is also understood that coupler or parts thereof can be provided with various coatings to protect against rust and other corrosion. It is further understood that various changes may be made in adapting the invention to different embodiments without departing from the broader concepts disclosed herein and comprehended by the claims that follow.

The invention claimed is:
1. A coupler for coupling together the end portions of two pipes wherein the end portions of the two pipes have radial pipe flanges extending therefrom, comprising:
   a single piece cylindrical base body having a length and a receiving opening therethrough to receive and surround the end portions of the pipes to be coupled and bridging over a gap between the pipes to be coupled;
   at least one arcuate coupling member, each of the at least one arcuate coupling members having opposite sides, opposite end portions with opposite end flanges extending inwardly from the opposite end portions, and a length between said opposite end flanges greater than the length of the cylindrical base body, said at least one arcuate coupling member connectable to the cylindrical base body in a coupling position wherein when the end portions of the pipes to be coupled are received in the receiving opening of the cylindrical base body, the opposite end flanges of the arcuate coupling member prevent the passage of the radial pipe flanges to thereby secure the end portions of the pipes to be connected in the single piece cylindrical base body in a connected position;
a holding mechanism for holding the at least one arcuate coupling member its coupling position;
at least one set of truncated flanges extending from the cylindrical base body, each of said truncated flanges of a set of truncated flanges having an opening extending therethrough with said openings through the truncated flanges of each set being aligned;
a connector on a side of the at least one arcuate coupling member;
a fastener shaft adapted to extend between aligned openings through a said set of truncated flanges and to extend through the connector to pivotally connect the at least one arcuate coupling member to the cylindrical base body whereby the arcuate coupling member can rotate between an uncoupling position and the coupling position; and
wherein the holding mechanism includes a connector on the opposite side of the at least one arcuate coupling member cooperable with a holding member attached to the cylindrical base body.

2. A coupler for coupling together the end portions of two pipes according to claim 1, wherein the holding member attached to the cylindrical base body includes a second set of truncated flanges extending from the cylindrical base body, said second set of truncated flanges having an opening extending therethrough with said openings through the truncated flanges of each set being aligned, and a second fastener shaft adapted to extend between aligned openings through the second set of truncated flanges and to extend through the connector on the opposite side of the arcuate coupling member to connect the opposite side of the at least one arcuate coupling member to the cylindrical base body to hold the arcuate coupling member in the coupling condition.

3. A coupler for coupling together the end portions of two pipes wherein the end portions of the two pipes have radial pipe flanges extending therefrom, comprising:
a single piece cylindrical base body having a length and a receiving opening therethrough to receive and surround the end portions of the pipes to be coupled and bridging over a gap between the pipes to be coupled;
at least one arcuate coupling member, each of the at least one arcuate coupling members having opposite sides, opposite end portions with opposite end flanges extending inwardly from the opposite end portions, and a length between said opposite end flanges greater than the length of the cylindrical base body, said at least one arcuate coupling member connectable to the cylindrical base body in a coupling position wherein when the end portions of the pipes to be coupled are received in the receiving opening of the cylindrical base body, the opposite end flanges of the arcuate coupling member prevent the passage of the radial pipe flanges to thereby secure the end portions of the pipes to be connected in the single piece cylindrical base body in a connected position;
a holding mechanism for holding the at least one arcuate coupling member in coupling, position;
at least one set of truncated flanges extending from the cylindrical base body, each of said truncated flanges of a set of truncated flanges having an opening extending therethrough with said openings through the truncated flanges of each set being aligned;
a connector on a side of the at least one arcuate coupling member;
a fastener shall adapted to extend between aligned openings through a said set of truncated flanges and to extend through the connector to pivotally connect the at least one arcuate coupling member to the cylindrical base body whereby the arcuate coupling member can rotate between an uncoupling position and the coupling position; and
wherein the at least one arcuate coupling member is two arcuate coupling members, wherein each of the truncated flanges of the at least one set of truncated flanges includes two openings with each of the two openings in one truncated flange of the at least one set of truncated flanges aligning with each of two openings in the other truncated flange, wherein a fastener shaft is adapted to extend between aligned openings through the truncated flanges of the at least one set of truncated flanges and to extend through respective connectors of the two arcuate coupling members to separately pivotally connect the two arcuate coupling members to the cylindrical base body whereby each of the two arcuate coupling member can rotate between an uncoupling position and the coupling position.

4. A coupler for coupling together the end portions of two pipes according to claim 3, wherein each arcuate coupling member has a connector on the opposite side of the arcuate coupling member and additionally including a second set of truncated flanges extending from the cylindrical base body, each truncated flange of the second set of truncated flanges having two openings extending therethrough with each of the two openings in one truncated flange aligned with each of the two openings in the other truncated flange, wherein, when the arcuate coupling members are in coupling position, a fastener shaft is adapted to extend between aligned openings through the truncated flanges of the second set of truncated flanges and through the connectors on the opposite sides of the two arcuate coupling members to hold the arcuate coupling member in the coupling condition.

5. A coupler for coupling together the end portions of two pipes wherein the end portions of the two pipes have radial pipe flanges extending therefrom, comprising:
a single piece cylindrical base body having a length and a receiving opening therethrough to receive and surround the end portions of the pipes to be coupled and bridging over a gap between the pipes to be coupled;
at least one arcuate coupling member, each of the at least one arcuate coupling members having opposite sides, opposite end portions with opposite end flanges extending inwardly from the opposite end portions, and a length between said opposite end flanges greater than the length of the cylindrical base body, said at least one arcuate coupling member connectable to the cylindrical base body in a coupling position wherein when the end portions of the pipes to be coupled are received in the receiving opening of the cylindrical base body, the opposite end flanges of the arcuate coupling member prevent the passage of the radial pipe flanges to thereby secure the end portions of the pipes to be connected in the single piece cylindrical base body in a connected position;
a holding mechanism for holding the at least one arcuate coupling member in coupling position;
at least one set of truncated flanges extending from the cylindrical base body, each of said truncated flanges of a set of truncated flanges having an opening extending therethrough with said openings through the truncated flanges of each set being aligned;

a connector on a side of the at least one arcuate coupling member;

a fastener shaft adapted to extend between aligned openings through a said set of truncated flanges and to extend through the connector to pivotally connect the at least one arcuate coupling member to the cylindrical base body whereby the arcuate coupling member can rotate between an uncoupling position and the coupling position; and wherein the at least one arcuate coupling member is two arcuate coupling members, each of the two arcuate coupling members having a connector on one side thereof and on the opposite side thereof, wherein the at least one set of truncated flanges is two sets of truncated flanges, each set of said truncated flanges having two sets of aligned openings therethrough, wherein a fastener shaft is adapted to extend between each of the two aligned openings through one set of truncated flanges and to extend through the connectors at one side of each of the two arcuate coupling members to separately pivotally connect the two arcuate coupling members to the cylindrical base body whereby each of the two arcuate coupling members can rotate between an uncoupling position and the coupling position, and wherein, when the coupling members are rotated to coupling positions, a fastener shaft is adapted to extend between each of the two aligned openings through the second set of truncated flanges and to extend through the connectors on the opposite side of each of the two arcuate coupling members to separately hold the two arcuate coupling members to the cylindrical base body in coupling position.

\* \* \* \* \*